(12) United States Patent
Vendelbo

(10) Patent No.: US 10,715,934 B2
(45) Date of Patent: Jul. 14, 2020

(54) HEARING SYSTEM AND METHOD OF RETRIEVING HEARING DEVICE DATA

(71) Applicant: GN HEARING A/S, Ballerup (DK)

(72) Inventor: Allan Munk Vendelbo, Valby (DK)

(73) Assignee: GN HEARING A/S, Lautrupbjerg (DK)

( * ) Notice: Subject to any disclaimer, the term of this patent is extended or adjusted under 35 U.S.C. 154(b) by 0 days.

(21) Appl. No.: 15/815,247

(22) Filed: Nov. 16, 2017

(65) Prior Publication Data

US 2018/0167748 A1 Jun. 14, 2018

(30) Foreign Application Priority Data

Dec. 8, 2016 (EP) ..................................... 16202915

(51) Int. Cl.
*H04R 25/00* (2006.01)
*H04L 29/06* (2006.01)

(52) U.S. Cl.
CPC ......... *H04R 25/554* (2013.01); *H04L 63/123* (2013.01); *H04R 25/604* (2013.01); *H04R 25/70* (2013.01); *H04R 2225/51* (2013.01); *H04R 2225/55* (2013.01); *H04R 2225/61* (2013.01)

(58) Field of Classification Search
CPC .. H04R 25/558; H04R 25/554; H04R 25/505; H04R 25/70; H04R 25/55; H04R 2225/55
See application file for complete search history.

(56) References Cited

U.S. PATENT DOCUMENTS

2016/0050507 A1* 2/2016 Moore ................... A61B 5/123
381/57
2017/0180886 A1* 6/2017 Van Der Loo ....... H04R 25/554

* cited by examiner

*Primary Examiner* — Amir H Etesam
(74) *Attorney, Agent, or Firm* — Vista IP Law Group, LLP

(57) ABSTRACT

The present disclosure relates to methods and devices for a hearing system. A method of retrieval of hearing device data from a hearing device of a hearing system is provided, wherein retrieval of hearing device data comprises obtaining challenge data in a server device of the hearing system; transmitting the challenge data from the server device to a user application of a user accessory device; transmitting a challenge request comprising the challenge data from the user application to the hearing device; receiving a challenge response comprising response data from the hearing device; forwarding the response data from the user application to the server device; verifying the response data in the server device based on the challenge data; and optionally deriving the hearing device data from the response data, if verifying the response data is successful.

28 Claims, 4 Drawing Sheets

US 10,715,934 B2

HEARING SYSTEM AND METHOD OF RETRIEVING HEARING DEVICE DATA

RELATED APPLICATION DATA

This application claims priority to, and the benefit of, European Patent Application No. 16202915.1, filed on Dec. 8, 2016, pending. The entire disclosure of the above application is expressly incorporated by reference herein.

FIELD

The present disclosure relates to a hearing system comprising a server device and a hearing device system, wherein the hearing device system comprises a hearing device and a user accessory device. In particular, the present disclosure relates to devices/applications for retrieval of hearing device data, and a method of retrieval of hearing device data from a hearing device of a hearing system.

BACKGROUND

Wireless communication to and from different entities of a hearing system has been increasing in continuation of the developments within wireless communication technology. However, the new technologies entail new challenges for the hearing aid manufacturers to secure communication in a hearing system. Wireless communication interfaces of a hearing system desirably use an open standard-based interface. However, this poses many challenges in terms of security.

SUMMARY

There is a need for apparatus, devices, and methods for providing improved security for hearing system communication. Further, there is a need for devices and methods reducing the risk of a hearing device data being compromised by a third (unauthorized) party.

Accordingly, a method of retrieval of hearing device data from a hearing device of a hearing system is provided, wherein retrieval of hearing device data comprises obtaining challenge data in a server device of the hearing system; transmitting the challenge data from the server device to a user application of a user accessory device; transmitting a challenge request comprising the challenge data from the user application to the hearing device; receiving a challenge response comprising response data from the hearing device; forwarding the response data from the user application to the server device; verifying the response data in the server device based on the challenge data; and optionally deriving the hearing device data from the response data, if verifying the response data is successful.

Also, a server device for retrieval of hearing device data from a hearing device of a hearing system comprising the server device is provided, wherein the server device is configured to retrieve hearing device data from the hearing device, wherein to retrieve hearing device data from the hearing device comprises to obtain challenge data; transmit the challenge data, e.g. to a user application of a user accessory device; receive a response message comprising response data, e.g. from the user application; verify the response data based on the challenge data; and optionally to derive the hearing device data from the response data, if the response data are verified.

A user application for a user accessory device of a hearing system is provided, the user accessory device comprising a processing unit; a memory unit; and an interface, wherein the user application is configured to retrieve hearing device data from a hearing device of the hearing system, and wherein to retrieve hearing device data comprises to: obtain challenge data from a server device; transmit a challenge request comprising the challenge data to a hearing device of the hearing system; receive a challenge response comprising response data from the hearing device; and transmit the response data to the server device.

Also, a hearing device is disclosed, the hearing device comprising a processor, an antenna and a radio transceiver coupled to the antenna for receiving/transmitting wireless communication, the hearing device comprising a set of microphones comprising a first microphone for provision of a first microphone input signal, where in the processor is connected to the radio transceiver and the first microphone for receiving and processing transceiver and microphone input signals, wherein the processor is configured to compensate for a hearing loss of a user based on hearing device settings and to provide an electrical output signal based on the input signals and the hearing device settings, the hearing device comprising a receiver connected to the processor for converting the electrical output signal to an audio output signal to be directed towards an eardrum of the hearing device user, wherein the hearing device is configured to receive a challenge request comprising challenge data from a user application to the hearing device; generating response data based on the challenge data and hearing device data; and transmitting a challenge response comprising the response data to the user application.

It is an important advantage of the present disclosure that the risk of user sensitive data, such as hearing device data, being sent to or shared with third parties is heavily reduced. Further, the present disclosure allows for a reduced need for hearing device users to report hearing device data to the hearing device manufacturer.

Further, the present disclosure allows a hearing device manufacturer to keep and maintain updated and correct information on hearing devices. In particular, the hearing device manufacturer can determine if crucial firmware updates have been downloaded to a hearing device.

A method performed by a server device for retrieval of hearing device data of a hearing device, includes: obtaining challenge data in the server device; transmitting the challenge data from the server device to a user accessory device; receiving response data from the user accessory device; verifying the response data in the server device based on the challenge data; and deriving the hearing device data from the response data, if the act of verifying the response data results in a successful verification.

Optionally, the act of deriving the hearing device data comprises decrypting the response data based on the challenge data to obtain the hearing device data.

Optionally, the method further includes: receiving a request for the challenge data from the user accessory device, wherein the act of obtaining the challenge data is performed in response to the request for the challenge data.

Optionally, the request for the challenge data is received based on a satisfaction of a criterion.

Optionally, the method further includes storing the hearing device data and a hearing device data timestamp indicative of time of hearing device data retrieval.

Optionally, the method further includes: determining if a retrieving criterion based on a last hearing device data timestamp is fulfilled; and initiating retrieval of the hearing device data if the retrieving criterion is fulfilled.

Optionally, the challenge data is stored in the server device.

Optionally, the act of obtaining the challenge data comprises calculating the challenge data in the server device.

Optionally, the user accessory device is configured to transmit a challenge request comprising the challenge data to the hearing device, receive a challenge response comprising the response data from the hearing device, and transmit the response data to the server device.

A method performed by a user accessory device that is in communication with a hearing device and a server device, includes: receiving challenge data from the server device; transmitting a challenge request comprising the challenge data to the hearing device; receiving a challenge response comprising response data from the hearing device; and transmitting the response data to the server device.

Optionally, the response data from the hearing device is based on the challenge data and a hearing device identifier of the hearing device.

Optionally, the method further includes transmitting a request for the challenge data to the server device.

Optionally, the request for the challenge data is transmitted by the user accessory device based on a satisfaction of a criterion.

Optionally, the response data is transmitted to the server device for verification of the response data based on the challenge data, and for allowing the server device to derive the hearing device data from the response data if the response data is successfully verified.

A server device for retrieval of hearing device data of a hearing device, includes: a processing unit configured to obtain challenge data; and a communication interface for communication with a user accessory device, wherein the communication interface is configured to transmit the challenge data to the user accessory device, and receive response data from the user accessory device; wherein the processing unit is also configured to: verify the response data based on the challenge data; and derive the hearing device data from the response data, if the response data is successfully verified.

Optionally, the server device further includes a non-transitory medium for storing the hearing device data and a hearing device data timestamp indicative of time of hearing device data retrieval.

Optionally, the communication interface is configured to receive a request for the challenge data from the user accessory device, and wherein the processing unit is configured to obtain the challenge data in response to the request for the challenge data.

Optionally, the processing unit is configured to determine if a retrieving criterion based on a last hearing device data timestamp is fulfilled, and to initiate retrieval of the hearing device data if the second retrieving criterion is fulfilled.

Optionally, the user accessory device is configured to transmit a challenge request comprising the challenge data to the hearing device, receive a challenge response comprising the response data from the hearing device, and transmit the response data to the server device.

A user accessory device includes: a processing unit; a memory unit coupled to the processing unit; and a communication interface configured to communicate with a hearing device; wherein the user accessory device is configured to receive challenge data from a server device; transmit a challenge request comprising the challenge data to the hearing device; receive a challenge response comprising response data from the hearing device; and transmit the response data to the server device.

Optionally, the user accessory device is configured to transmit the response data to the server device for verification of the response data based on the challenge data, and for allowing the server device to derive hearing device data from the response data if the response data is successfully verified.

Optionally, the user accessory is configured to determine if a criterion is fulfilled, and transmit a request for the challenge data if the criterion is fulfilled.

Optionally, the user accessory device is configured to transmit a request for the challenge data to the server device.

A program product includes a set of instructions, an execution of which by a processing unit of a user accessory device will cause the user accessory device to perform a method, the method comprising: receiving challenge data from a server device; transmitting a challenge request comprising the challenge data to a hearing device; receiving a challenge response comprising response data from the hearing device; and transmitting the response data to the server device.

Optionally, the response data is transmitted to the server device for verification of the response data based on the challenge data, and for allowing the server device to derive the hearing device data from the response data if the response data is successfully verified.

Optionally, the method further comprises determining if a criterion is fulfilled, and transmitting a request for the challenge data if the criterion is fulfilled.

Optionally, the method further comprises transmitting a request for the challenge data to the server device.

A hearing device includes: a processor configured to compensate for a hearing loss of a user of the hearing device, and to provide an electrical output signal; a radio transceiver for wireless communication, the radio transceiver coupled to the processor; a microphone for provision of a microphone input signal, the microphone being coupled to the processor; and a receiver connected to the processor for converting the electrical output signal to an audio output signal to be directed towards an eardrum of the user of the hearing device; wherein the hearing device is configured to: receive a challenge request comprising challenge data from a user accessory device; generate response data based on the challenge data and hearing device data; and transmit a challenge response comprising the response data to the user accessory device.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
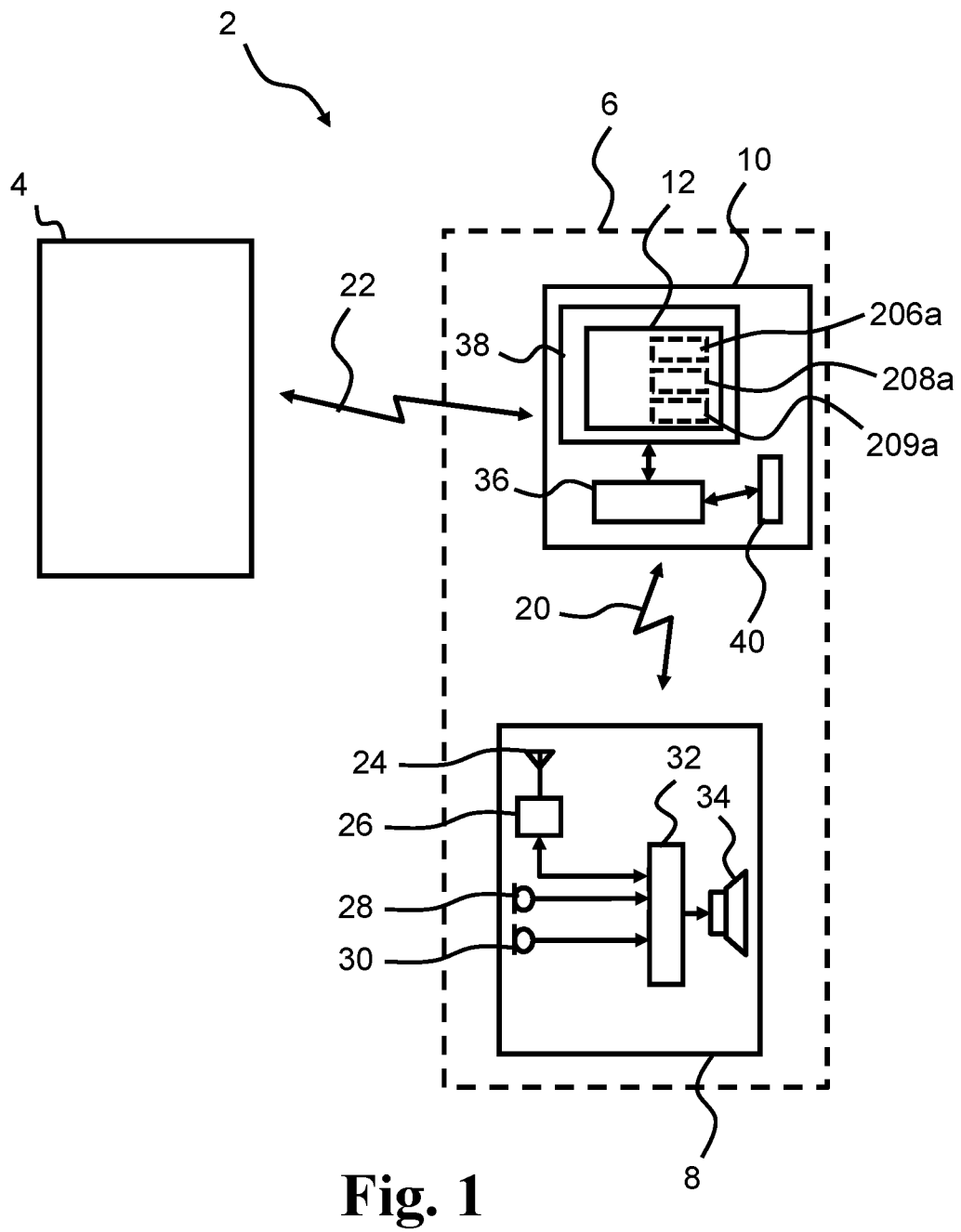
FIG. 1 schematically illustrates a hearing system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments.

They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing system communication. The hearing system comprises a server device, a user accessory device having a user application installed thereon and a hearing device. The hearing device manufacturer may control the server device. The server device may be a distributed server device, i.e. a server device with distributed processor. Namely, the method, user application and server device disclosed herein enables hearing system communication that is robust against security threats, vulnerabilities, and attacks by implementing appropriate safeguards and countermeasures, such as security mechanisms, to protect against threats and attacks. The present disclosure relates to hearing system communication that is robust against replay attacks, unauthorized access, battery exhaustion attacks, and man-in-the-middle attacks.

As used herein the term "identifier" refers to a piece of data that is used for identifying, such as for categorizing, and/or uniquely identifying. The identifier may be in a form of a word, a number, a letter, a symbol, a list, an array, or any combination thereof. For example, the identifier as a number may be in the form of an integer, such as unsigned integer, unit, with a length of e.g. 8 bits, 16 bits, 32 bits, or more, such as an array of unsigned integers. An identifier may have a length of several bytes. For example, a hearing device identifier may have a length of 20 bytes.

The user accessory device comprises a memory unit and an interface respectively connected to a processing unit. The memory unit may include removable and non-removable data storage units including, but not limited to, Read Only Memory (ROM), Random Access Memory (RAM), etc. The memory unit has a user application stored thereon. The interface comprises an antenna and a wireless transceiver, e.g. configured for wireless communication at frequencies in the range from 2.4 to 2.5 GHz. The interface may be configured for communication, such as wireless communication, with the hearing device comprising an antenna and a wireless transceiver.

The method comprises obtaining challenge data in a server device of the hearing system. Obtaining challenge data may comprise generating the challenge data, e.g. based on a default challenge value, optionally stored in memory/look-up table, and/or a timestamp. Accordingly, the server device may be configured to generate the challenge data, e.g. based on a default challenge value and/or a timestamp. The server device may be configured to generate the challenge data at a certain interval, such as every 5 minutes, every 10 minutes, or every 30 minutes. While a short time between generation of (different) challenge data may increase security, a too short time between generation of (different) challenge data may set too high timing requirements for the user application/hearing device, which in turn leads to unnecessary faulty verifications and requires power-consuming challenge-response generation in the hearing device. The challenge data may be random or pseudo-random. The challenge data may comprise at least 8 bytes, such as at least 12 bytes or at least 16 bytes. The challenge data may be a 16-bytes value. The server device may be configured to generate the challenge data based on a look-up table and/or a function, e.g. having a timestamp as input. Obtaining challenge data based on a timestamp value enables and/or provides challenge data with a built-in validity period. Obtaining challenge data with a given interval enables and/or provides challenge data with a built-in validity period.

The present disclosure relates to secure communication between entities of a hearing system. The hearing system comprises a server device and a hearing device system, the hearing device system comprising a user accessory device and a hearing device. The user accessory device forms an accessory device to the hearing device. The user accessory device is typically paired or otherwise wirelessly coupled to the hearing device. The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. Typically, the hearing device system is in possession of and controlled by the hearing device user.

Obtaining challenge data may comprise storing the challenge data in the server device. The server device may be configured to delete the challenge data after verifying the response data. The method may comprise deleting the challenge data after a certain period of time and/or replacing the challenge data with new challenge data.

The method comprises transmitting the challenge data from the server device to the user application.

The method comprises transmitting a challenge request comprising the challenge data from the user application to the hearing device. Thus, the user application receives challenge data from the server device and forwards the challenge data or at least parts thereof to the hearing device in a challenge request.

The method comprises receiving a challenge response, e.g. in the user application, the challenge response comprising response data from the hearing device. The response data may comprise at least 8 bytes, such as at least 16 bytes or at least 32 bytes. The response data may have a length in the range from 16 to 96 bytes. The response data may be from 70 bytes to 90 bytes long.

The response data comprises a challenge response value and/or hearing device data. The response data may comprise a checksum value based on the challenge response value and/or the hearing device data. The challenge response value may be based on the challenge data and/or hearing device data, e.g. hearing device identifier.

The method comprises forwarding the response data from the user application to the server device, e.g. in a response message. The response data, e.g. a challenge response value of the response data, are verified in the server device based on the challenge data. Verifying the response data in the server device based on the challenge data may comprise calculating the challenge data, e.g. based on a default challenge value and/or a timestamp. Verifying the response data in the server device based on the challenge data may comprise retrieving the challenge data from a memory of the server device.

The method optionally comprises deriving the hearing device data from the response data and/or storing the hearing device data, if verifying the response data is successful. Storing the hearing device data, if verifying the response data is successful, may comprise storing a hearing device data timestamp indicative of time of hearing device data retrieval, e.g. in the server device. The method may comprise initiating retrieval of hearing device data if verifying the response data fails. The method may comprise setting a data retrieval status identifier to a value indicative of the hearing device data not being retrieved if verifying the response data fails, optionally together with a timestamp indicative of time of failed hearing device data retrieval.

In the method, receiving a challenge response comprising response data from the hearing device may be performed by the user application, i.e. the challenge response may be received in the user application.

The method may comprise determining the response data in the hearing device based on the challenge data and/or a hearing device identifier of the hearing device. Thus, the hearing device may be configured to generate the response data based on the challenge data and/or a hearing device identifier. Response data based on a hearing device identifier enables the server device to authenticate and identify the hearing device. The response data optionally comprises or is indicative of a hearing device identifier. Thus, the server device can identify a specific hearing device.

The hearing device data may comprise a hearing device identifier. The hearing device data may comprise an address identifier, such as a Bluetooth address, and/or a serial number. The hearing device data may comprise a software version identifier and/or a hearing device model identifier. The hearing device may comprise one or more logging register entries. The logging register entries may comprise client device identifier(s) of client devices having initiated or attempted a communication session with the hearing device, optionally with timestamp(s) indicative of time of communication session or communication session attempt. Accordingly, the server device/hearing device manufacturer can collect information on which client devices are used for hearing device and thus enabling the hearing device manufacturer to detect misuse/copying of a client device.

In the method, deriving the hearing device data may comprise decrypting the response data, e.g. based on the challenge data, to obtain the hearing device data.

The method may comprise receiving a request for challenge data from the user application, and initiating retrieval of hearing device data upon receipt of the request for challenge data from the user application. Thus, the user application and/or hearing device may be able to initiate hearing device data retrieval in the server device, e.g. if the hearing device, e.g. firmware, hearing device model and/or hearing device settings, is or has been updated. Further, the user application and/or hearing device may be able to initiate hearing device data retrieval in the server device if the user accessory device and/or the hearing device experience/detects third party attacks from unauthorized devices.

The method may comprise transmitting the request for challenge data from the user application if a first retrieving criterion is fulfilled. The first retrieval criterion may be fulfilled if a user of the user application indicates hearing device data retrieval via the interface of the user accessory device. The first retrieval criterion may be fulfilled if the user application detects that new or updated software has been downloaded in the hearing device. The first retrieval criterion may be fulfilled if the price point of the hearing device has been changed, e.g. if more functionality has been added to the hearing device by a software update. The first retrieval criterion may be fulfilled if the user application receives a request for hearing device data upload from the hearing device.

The method may comprise storing the hearing device data and/or a hearing device data timestamp indicative of time of hearing device data retrieval, e.g. in the server device.

The method may comprise determining if a second retrieving criterion, e.g. based on a last hearing device data timestamp, is fulfilled; and optionally initiating retrieval of hearing device data if the second retrieving criterion is fulfilled.

In the method, obtaining challenge data comprises storing the challenge data in the server device, and/or wherein verifying the response data in the server device based on the challenge data comprises calculating the challenge data.

The method may comprise establishing a secure session between the user application and the hearing device and optionally transmitting the challenge request in the secure session, such as an integrity-protected, encrypted, authenticated, and/or mutually authenticated session. The challenge response may be received in the secure session.

The method may comprise establishing a secure session, such as an integrity-protected, encrypted, authenticated, and/or mutually authenticated session, between the server device and the user application, and optionally transmitting the challenge data in the secure session. The response data may be forwarded from the user application to the server device in the secure session.

Turning now to again to describing the server device, the server device may be configured to store the hearing device data and/or a hearing device data timestamp indicative of time of hearing device data retrieval, optionally together with a data retrieval status indicator indicative of failure or success of hearing device data retrieval.

The server device may be configured to receive a request for challenge data from the user application, and optionally to initiate retrieval of hearing device data upon receipt of the request for challenge data from the user application. Thus, the user application/hearing device can activate hearing device data retrieval therefrom, which again facilitates a server device with hearing device data that are updated when necessary.

The server device may be configured to determine if a second retrieving criterion based on a last hearing device data timestamp is fulfilled; and optionally to initiate retrieval of hearing device data if the second retrieving criterion is fulfilled. The second retrieving criterion may be fulfilled if the time since last hearing device data retrieval is longer than a retrieval time threshold, e.g. one or more days, such as 7 days, 14 days. Thus, retrieval of hearing device data with a minimum frequency may be employed to ensure updated hearing device data in the server device.

The present disclosure also relates to a user application for a user accessory device of a hearing system. The user accessory device may be a smartphone, a smartwatch, or a tablet computer. The user application is, when installed on the user accessory device, configured to retrieve hearing device data from a hearing device of the hearing system.

To retrieve hearing device data comprises to obtain challenge data from a server device. To obtain challenge data with the user application may comprise to transmit a request for challenge data to the server device. Thus, the user application may be able to initiate hearing device data retrieval in the server device.

To obtain challenge data from a server device may comprise to determine if a first retrieving criterion is fulfilled, i.e. the user application is configured to determine if a first retrieving criterion is fulfilled and optionally to retrieve the hearing device data if the first retrieving criterion is fulfilled. The first retrieving criterion may be fulfilled in the user application if the hearing device, e.g. firmware, hearing device model and/or hearing device settings, is updated. The first retrieving criterion may be fulfilled, e.g. if the user application detects a successful transmission of hearing device settings or firmware to the hearing device. Further, the user application and/or hearing device (via the user application) may be able to initiate hearing device data retrieval in the server device if the user accessory device and/or the hearing device experience/detects third party attacks from unauthorized devices.

The request for challenge data from the user application is a message requesting the server device to transmit challenge data to the user application. Thus, the user application can actively initiate hearing device data retrieval. By enabling the hearing system entities to initiate hearing device data retrieval, the retrieval procedures or schemes can be optimized, e.g. by enabling the data retrieval procedure to be initiated only when necessary or when justified due to changes in the different entities in the hearing system.

Throughout, the same reference numerals are used for identical or corresponding parts.

FIG. 1 shows an exemplary hearing system. The hearing system 2 comprises a server device 4 and a hearing device system 6 comprising a hearing device 8 and a user accessory device 10. The user accessory device 10 may be a smartphone configured to wirelessly communicate with the hearing device 8. A user application 12 is installed on the user accessory device 10. The user application may be for controlling the hearing device 8 and/or assisting a hearing device user. In one or more exemplary user applications, the user application 12 is configured to transfer firmware and/or hearing device settings to the hearing device 8.

The server device 4 and/or the user application 12 may be configured to perform any acts of the method disclosed herein. The hearing device 8 may be configured to compensate for hearing loss of a user of the hearing device 8. The hearing device 8 is configured to configured to communicate with the user accessory device 10/user application 12, e.g. using a wireless and/or wired first communication link 20. The first communication link 20 may be a single hop communication link or a multi-hop communication link. The first communication link 20 may be carried over a short-range communication system, such as Bluetooth, Bluetooth low energy, IEEE 802.11 and/or Zigbee.

The user accessory device 10/user application 12 is configured to connect to the server device 4 over a network, such as the Internet and/or a mobile phone network, via a second communication link 22. The server device 4 may be controlled by the hearing device manufacturer. The hearing device 8 comprises an antenna 24 and a radio transceiver 26 coupled to the antenna 24 for receiving/transmitting wireless communication including first communication link 20. The hearing device 8 comprises a set of microphones comprising a first microphone 28 and optionally a second microphone 30 for provision of respective first and second microphone input signals. The hearing device 8 may be a single-microphone hearing device. The hearing device 8 comprises a memory unit (not shown) connected to the processor, wherein hearing device settings are stored in the memory unit.

The hearing device 8 comprises a processor 32 connected to the transceiver 26 and microphones 28, 30 for receiving and processing transceiver and microphone input signals. The processor 32 is configured to compensate for a hearing loss of a user based on hearing device settings and to provide an electrical output signal based on the input signals. A receiver 34 converts the electrical output signal to an audio output signal to be directed towards an eardrum of the hearing device user.

The user accessory device 10 comprises a processing unit 36, a memory unit 38, an interface 40. The user application 12 is installed in the memory unit 38 of the user accessory device 10 and is configured to retrieve hearing device data from the hearing device 8, and wherein to retrieve hearing device data comprises to obtain challenge data from server device 4; transmit a challenge request comprising the challenge data to hearing device 8, e.g. with transmit module 206a; receive a challenge response comprising response data from the hearing device 8, e.g. with receive module 208a; and transmit or forward the response data to the server device 4, e.g. with forward module 209a.

Figure 2:
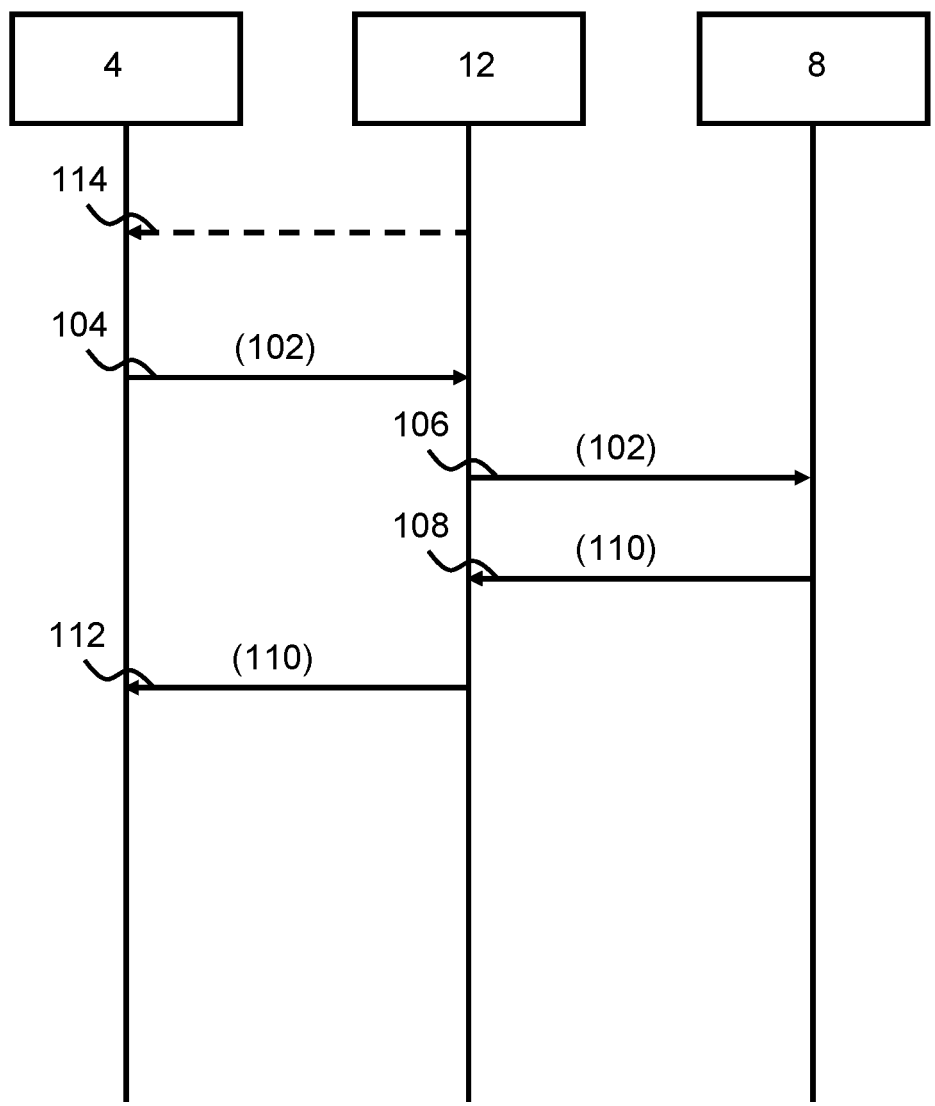
FIG. 2 shows an exemplary signaling diagram.

FIG. 2 shows an exemplary signaling diagram 100 between the entities 4, 8, 12 of the hearing system 2 illustrating an exemplary method of retrieval of hearing device data from a hearing device of a hearing system. Retrieval of hearing device data comprises obtaining challenge data in the server device 4. The method comprises transmitting the challenge data 102 in a challenge message 104 from the server device 4 to the user application 12. The user application 12 receives the challenge data 102 and transmits a challenge request 106 comprising the challenge data 102 from the user application 12 to the hearing device 8. Receipt of the challenge request 106 in the hearing device, triggers the hearing device 8 to generate response data 110 based on the challenge data and optionally a hearing device identifier of the hearing device. The hearing device 8 transmits a challenge response 108 comprising the response data 110 to the user application 12, the user application receiving the challenge response 108 comprising response data 110 from the hearing device 8. The user application forwards the response data 110 to the server device 4 in a response message 112, and the server device 4 verifies the response data 110 based on the challenge data and derives the hearing device data from the response data 110 if verifying the response data 110 is successful. The hearing device data or at least parts thereof are stored in the server device, optionally linked to the hearing device identifier. The hearing device data comprises one or more of a hearing device identifier, an address identifier, a serial number, a software version identifier, a hearing device model identifier, and logging register entries. The address identifier may be a Bluetooth address. The serial number may comprise a hardware serial number/hardware identifier of one or more hardware components in the hearing device, such as a processor identifier and/or a radio transceiver identifier. The hearing device may be configured to log data indicative of hearing device operation in logging register entries of a logging register. A logging register entry may comprise a client device identifier indicative of a client device attempting to access the hearing device optionally with a timestamp. By having a software version identifier included in the hearing device data, the server device can trigger/initiate software updates in the hearing device 8 if necessary.

Optionally, the method comprises transmitting a request 114 for challenge data from the user application 12 to the server device 4, e.g. if a first retrieving criterion is fulfilled. In the illustrated hearing system, the first retrieving criterion is fulfilled if the user application 12 has detected a firmware update in the hearing device 8 and/or that hearing device settings has been transmitted via the user application 12. Receipt of the request 114 for challenge data in the server device 4, i.e. a first retrieving criterion is fulfilled in server device 4, triggers or initiates retrieval of hearing device data in the server device 4. The server device 4 is configured to determine if a retrieving criterion is fulfilled, and the server device 4 is configured to initiate securing communication for the user application if the retrieving criterion is fulfilled. The retrieving criterion in the server device comprises a first retrieving criterion and optionally a second retrieving criterion. The second retrieving criterion is fulfilled if hearing device data has not been retrieved for a certain period of time, e.g. 7 days or 14 days. Thus, the second approval criterion may be based on a hearing device data timestamp indicative of time of last hearing device data retrieval. The retrieving criterion is fulfilled if the first retrieving criterion or the second retrieving criterion is fulfilled.

Figure 3:
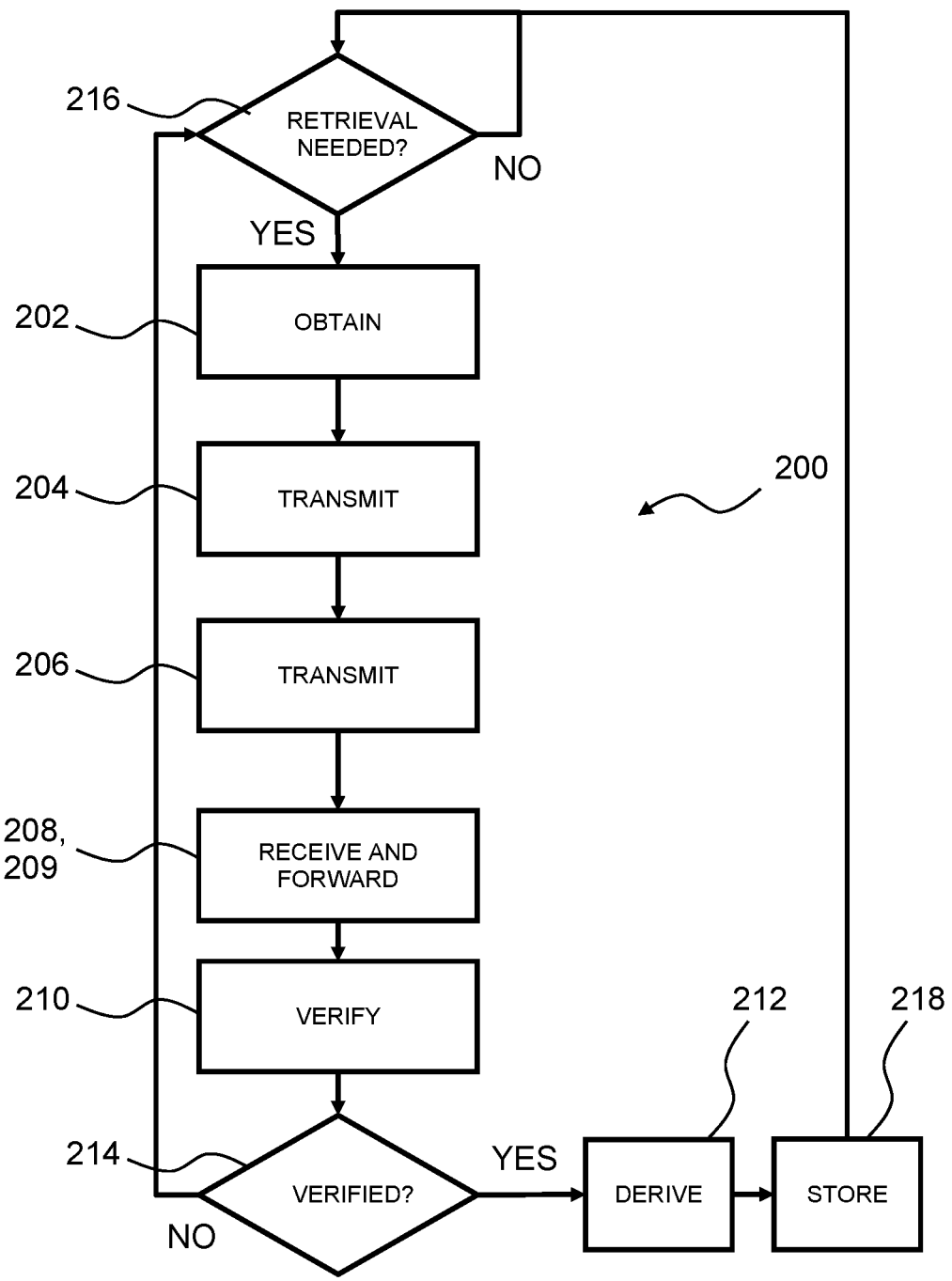
FIG. 3 is a flow diagram of an exemplary method.

FIG. 3 shows a flow diagram of an exemplary method of retrieval of hearing device data from a hearing device of a hearing system. In the method 200, retrieval of hearing device data comprises obtaining 202 challenge data in a server device, e.g. with obtain module 202a; transmitting 204, e.g. in a challenge message, the challenge data from the server device to the user application, e.g. with transmit module 204a; transmitting 206 a challenge request comprising the challenge data from the user application to the hearing device, e.g. with transmit module 206a; receiving 208 a challenge response comprising response data from the hearing device, e.g. by receive module 208a; and forwarding 209 the response data from the user application to the server device, e.g. with forward module 209a. The method 200 comprises verifying 210 the response data in the server device based on the challenge data, e.g. by verification module 210a; and deriving 212 the hearing device data from the response data in the server device, e.g. with derive module 212a, if verifying the response data is successful 214. Deriving 212 the hearing device data comprises decrypting the response data based on the challenge data to obtain the hearing device data. The method 200 comprises storing 218 the hearing device data or at least parts thereof and a hearing device data timestamp indicative of time of hearing device data retrieval in a memory of the server device, e.g. with storing module 218a, optionally followed by a return to 202 or 216. The method 200 may comprise initiating retrieval of hearing device data, e.g. by returning to 202 or 216 if verifying 210, 214 the response data fails, i.e. no verification. The method 200 may comprise setting (not shown) a data retrieval status identifier to a value indicative of the hearing device data not being retrieved if verifying the response data fails, optionally together with a timestamp indicative of time of failed hearing device data retrieval, e.g. followed by a return to 202 or 216.

Optionally, the method 200 comprises determining 216 if a retrieving criterion is fulfilled in the server device and proceed with retrieval of hearing device data if the retrieving criterion is met. Determining 216 if a retrieving criterion is met comprises determining if a second retrieving criterion based on a last hearing device data timestamp is fulfilled and initiating retrieval of hearing device data if the second retrieving criterion is fulfilled, e.g. if the time since last hearing device data retrieval is longer than a retrieval time threshold of e.g. 7 days.

Figure 4:
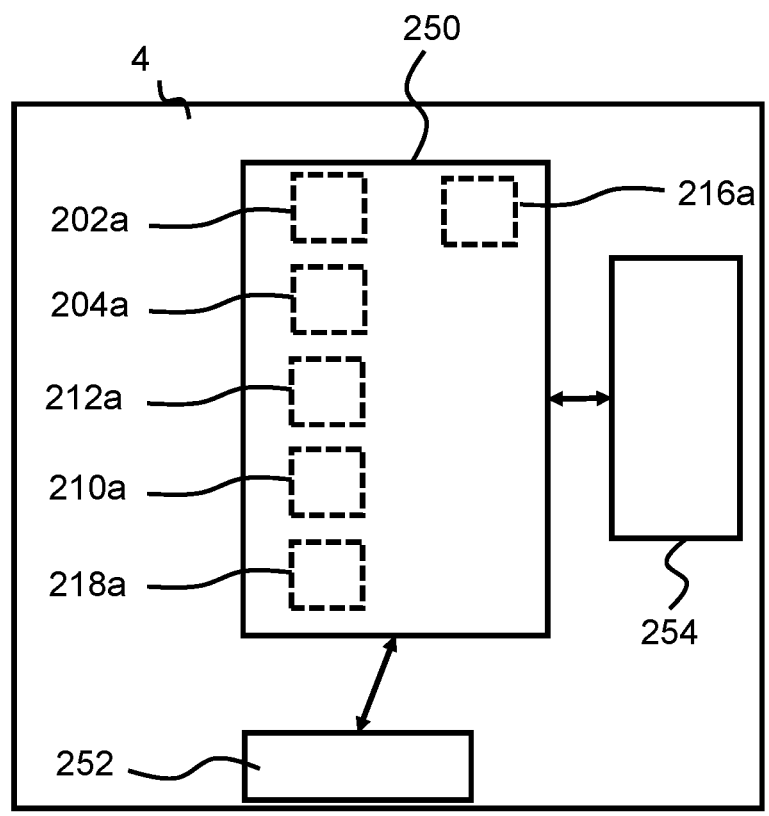
FIG. 4 schematically illustrates an exemplary server device.

FIG. 4 shows an exemplary server device for retrieval of hearing device data from a hearing device of a hearing system. The server device 4 comprises a processing unit 250, a memory unit 252, e.g. comprising a database, and an interface 254. The server device 4 is configured to retrieve hearing device data from the hearing device, wherein to retrieve hearing device data from the hearing device comprises to obtain challenge data. To obtain challenge data comprises to generate challenge data, e.g. based on a default challenge value and/or a timestamp. The challenge data has a length of 16 bytes. The server device is configured to transmit the challenge data via the interface 254 to a user application of a user accessory device in a challenge message and receive a response message comprising response data from the user application via the interface 254. The server device is configured to verify the response data, e.g. a challenge response value of the response data, based on the challenge data and/or a hearing device identifier. The server device may comprise a hardware security module (not shown) configured to verify the response data/challenge response value. If the response data are verified, the server device is configured to derive the hearing device data from the response data and store the hearing device data, optionally together with a hearing device data timestamp, in the memory unit 252. To verify the response data optionally comprises calculating the challenge data and verify the response data based on the calculated challenge data. Calculating challenge data as part of the response data verification eliminates the need for memory in the server device and storing of challenge data. To verify the response data comprises to verify a challenge response value of the response data e.g. based on the challenge data and/or a hearing device identifier. To verify the response data in the server device may comprise to verify a checksum value of the response data.

The server device 4 is optionally configured to receive a request for challenge data from the user application via the interface 254, and to initiate retrieval of hearing device data upon receipt of the request for challenge data from the user application. Further, the server device 4 is optionally configured to determine if a second retrieving criterion based on a last hearing device data timestamp is fulfilled; and to initiate retrieval of hearing device data if the second retrieving criterion is fulfilled, e.g. if hearing device data has not been retrieved for a certain period of time, e.g. 14 days.

The server device 4 may be arranged to execute at least parts of methods of retrieval of hearing device data from a hearing device of a hearing system as disclosed herein. The server device or the processing unit 250 may further comprise a number of optional functional modules, such as any of an obtain module 202a configured to perform step 202, a transmit module 204a configured to perform step 204, a verification module 210a configured to perform step 210, derive module 212a configured to perform step 212, determine module 216a configured to perform step 216, and storing module 218a to perform step 218. In general terms, each functional module may be implemented in hardware or in software.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing system
4 server device
6 hearing device system
8 hearing device
10 user accessory device
12 user application
20 first communication link
22 second communication link
24 antenna
26 radio transceiver
28 first microphone
30 second microphone 32 processor
34 receiver
36 processing unit
38 memory unit
40 interface
100 signalling diagram
102 challenge data
104 challenge message
106 challenge request
108 challenge response
110 response data
112 response message
114 request for challenge data
200 method of retrieval of hearing device data from a hearing device
202 obtaining challenge data in a server device
202a obtain module
204 transmitting the challenge data
204a transmit module
206 transmitting a challenge request comprising the challenge data
206a transmit module
208 receiving a challenge response comprising response data
208a receive module
209 forwarding the response data
209a forward module
210 verifying the response data based on the challenge data
210a verification module
212 deriving hearing device data
212a derive module
214 verification of response data successful?
216 determining if a retrieving criterion is fulfilled
216a determine module
218 storing hearing device data
218a storing module
250 processing unit
252 memory unit
254 interface

The invention claimed is:

1. A method performed by a server device for retrieval of hearing device data of a hearing device, comprising:
receiving a request from a user accessory device;
obtaining challenge data in the server device after the request from the user accessory device is received by the server device;
transmitting the challenge data from the server device to the user accessory device;
receiving response data from the user accessory device;
verifying the response data in the server device based on the challenge data in the server device; and
deriving the hearing device data from the response data, if the act of verifying the response data results in a successful verification.

2. The method according to claim 1, wherein the act of deriving the hearing device data comprises decrypting the response data based on the challenge data to obtain the hearing device data.

3. The method according to claim 1, further comprising:
receiving a request for the challenge data from the user accessory device,
wherein the act of obtaining the challenge data is performed in response to the request for the challenge data.

4. The method according to claim 3, wherein the request for the challenge data is received based on a satisfaction of a criterion.

5. The method according to claim 1, further comprising storing the hearing device data and a hearing device data timestamp indicative of time of hearing device data retrieval.

6. The method according to claim 5, further comprising:
determining if a retrieving criterion based on a last hearing device data timestamp is fulfilled; and
initiating retrieval of the hearing device data if the retrieving criterion is fulfilled.

7. The method according to claim 1, wherein the challenge data is stored in the server device.

8. The method according to claim 1, wherein the act of obtaining the challenge data comprises calculating the challenge data in the server device.

9. The method according to claim 1, wherein the user accessory device is configured to transmit a challenge request comprising the challenge data to the hearing device, receive a challenge response comprising the response data from the hearing device, and transmit the response data to the server device.

10. A method performed by a user accessory device that is in communication with a hearing device and a server device, comprising:
transmitting a request to the server device
receiving challenge data from the server device after the request is transmitted to the server device;
transmitting a challenge request comprising the challenge data to the hearing device;
receiving a challenge response comprising response data from the hearing device; and
transmitting the response data to the server device.

11. The method according to claim 10, wherein the response data from the hearing device is based on the challenge data and a hearing device identifier of the hearing device.

12. The method according to claim 10, further comprising transmitting a request for the challenge data to the server device.

13. The method according to claim 12, wherein the request for the challenge data is transmitted by the user accessory device based on a satisfaction of a criterion.

14. A method performed by a user accessory device that is in communication with a hearing device and a server device, comprising:
transmitting a request to the server device;
receiving challenge data from the server device after the request is transmitted to the server device;
transmitting a challenge request comprising the challenge data to the hearing device;
receiving a challenge response comprising response data from the hearing device; and
transmitting the response data to the server device;
wherein the response data is transmitted to the server device for verification of the response data based on the challenge data, and for allowing the server device to derive the hearing device data from the response data if the response data is successfully verified.

15. A server device for retrieval of hearing device data of a hearing device, comprising:
a processing unit configured to obtain challenge data after the server device receives a request from a user accessory device; and
a communication interface for communication with the user accessory device, wherein the communication interface is configured to transmit the challenge data to the user accessory device, and receive response data from the user accessory device;
wherein the processing unit is also configured to:

verify the response data based on the challenge data; and derive the hearing device data from the response data, if the response data is successfully verified.

16. The server device according to claim 15, further comprising a non-transitory medium for storing the hearing device data and a hearing device data timestamp indicative of time of hearing device data retrieval.

17. The server device according to claim 15, wherein the communication interface is configured to receive a request for the challenge data from the user accessory device, and wherein the processing unit is configured to obtain the challenge data in response to the request for the challenge data.

18. The server device according to claim 16, wherein the processing unit is configured to determine if a retrieving criterion based on a last hearing device data timestamp is fulfilled, and to initiate retrieval of the hearing device data if the second retrieving criterion is fulfilled.

19. The server device according to claim 15, wherein the user accessory device is configured to transmit a challenge request comprising the challenge data to the hearing device, receive a challenge response comprising the response data from the hearing device, and transmit the response data to the server device.

20. A user accessory device comprising:
a processing unit;
a memory unit coupled to the processing unit; and
a communication interface configured to communicate with a hearing device;
wherein the user accessory device is configured to
transmit a request to a server device;
receive challenge data from the server device after the request is transmitted to the server device;
transmit a challenge request comprising the challenge data to the hearing device;
receive a challenge response comprising response data from the hearing device; and
transmit the response data to the server device.

21. A user accessory device comprising:
a processing unit;
a memory unit coupled to the processing unit; and
a communication interface configured to communicate with a hearing device;
wherein the user accessory device is configured to
transmit a request to a server device;
receive challenge data from the server device after the request is transmitted to the server device;
transmit a challenge request comprising the challenge data to the hearing device;
receive a challenge response comprising response data from the hearing device; and
transmit the response data to the server device;
wherein the user accessory device is configured to transmit the response data to the server device for verification of the response data based on the challenge data, and for allowing the server device to derive hearing device data from the response data if the response data is successfully verified.

22. The user accessory device according to claim 20, wherein the user accessory is configured to determine if a criterion is fulfilled, and transmit a request for the challenge data if the criterion is fulfilled.

23. The user accessory device according to claim 20, wherein the user accessory device is configured to transmit a request for the challenge data to the server device.

24. A program product having a non-transitory processor-readable medium storing a set of instructions, an execution of which by a processing unit of a user accessory device will cause the user accessory device to perform a method, the method comprising:
transmitting a request to a server device;
receiving challenge data from the server device after the request is transmitted to the server device;
transmitting a challenge request comprising the challenge data to a hearing device;
receiving a challenge response comprising response data from the hearing device; and
transmitting the response data to the server device.

25. A program product having a non-transitory processor-readable medium storing a set of instructions, an execution of which by a processing unit of a user accessory device will cause the user accessory device to perform a method, the method comprising:
transmitting a request to a server device;
receiving challenge data from the server device after the request is transmitted to the server device;
transmitting a challenge request comprising the challenge data to a hearing device;
receiving a challenge response comprising response data from the hearing device; and
transmitting the response data to the server device;
wherein the response data is transmitted to the server device for verification of the response data based on the challenge data, and for allowing the server device to derive the hearing device data from the response data if the response data is successfully verified.

26. The program product according to claim 24, wherein the method further comprises determining if a criterion is fulfilled, and transmitting a request for the challenge data if the criterion is fulfilled.

27. The program product according to claim 24, wherein the method further comprises transmitting a request for the challenge data to the server device.

28. A hearing device comprising:
a processor configured to compensate for a hearing loss of a user of the hearing device, and to provide an electrical output signal;
a radio transceiver for wireless communication, the radio transceiver coupled to the processor;
a microphone for provision of a microphone input signal, the microphone being coupled to the processor; and
a receiver connected to the processor for converting the electrical output signal to an audio output signal to be directed towards an eardrum of the user of the hearing device;
wherein the hearing device is configured to:
receive a challenge request comprising challenge data from a user accessory device;
generate response data based on the challenge data and hearing device data; and
transmit a challenge response comprising the response data to the user accessory device; and
wherein the hearing device is configured to log data indicative of an attempted communication session with the hearing device.

* * * * *